US012288867B2

(12) United States Patent
Cai et al.

(10) Patent No.: US 12,288,867 B2
(45) Date of Patent: Apr. 29, 2025

(54) FURNACE ATMOSPHERE CONTROL FOR LITHIUM-ION BATTERY CATHODE MATERIAL PRODUCTION

(71) Applicant: Air Products and Chemicals, Inc., Allentown, PA (US)

(72) Inventors: Jingjing Cai, Shanghai (CN); Paulina Weronika Kus, Milton Keynes (GB); Liang He, Allentown, PA (US); Guido Plicht, Dortmund (DE); David Millington, Staffordshire (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 18/230,845

(22) Filed: Aug. 7, 2023

(65) Prior Publication Data

US 2023/0378427 A1 Nov. 23, 2023

Related U.S. Application Data

(62) Division of application No. 17/314,505, filed on May 7, 2021, now Pat. No. 11,777,073.

(51) Int. Cl.
*H01M 4/04* (2006.01)
*F27D 7/06* (2006.01)
(Continued)

(52) U.S. Cl.
CPC .......... *H01M 4/0471* (2013.01); *F27D 7/06* (2013.01); *H01M 4/1391* (2013.01);
(Continued)

(58) Field of Classification Search
CPC .. H01M 4/0471; H01M 4/0483; H01M 4/045; H01M 4/1391; H01M 4/525;
(Continued)

(56) References Cited

U.S. PATENT DOCUMENTS 10,854,873 B2 * 12/2020 Furuichi ............... H01M 4/525
2007/0231691 A1 * 10/2007 Abe ....................... C01G 51/42
429/231.1
(Continued)

FOREIGN PATENT DOCUMENTS

CN 1908204 2/2007
CN 110608607 12/2019
(Continued)

OTHER PUBLICATIONS

Wen Liu, et al, "Nickel-Rich Layered Lithium Transitional-Metal Oxide for High-Energy Lithium-Ion Batteries", Angewandte Chemie International Edition, 54, 2015, 4440-4458.
(Continued)

*Primary Examiner* — Raymond Alejandro
(74) *Attorney, Agent, or Firm* — Amy Carr-Trexler

(57) ABSTRACT

A method and apparatus for controlling the atmosphere of a multizone calcination (firing) furnace for production of high-quality nickel-rich cathode material for lithium-ion and solid-state batteries. A high-quality oxygen-rich atmosphere is maintained to ensure the quality of the cathode material. An atmosphere control system continuously measures and analyzes the composition of the calcination furnace atmosphere in different zones and adjusts the flowrate of oxygen-rich atmosphere into the furnace to optimize the calcination process.

15 Claims, 2 Drawing Sheets

(51) Int. Cl.
*H01M 4/1391* (2010.01)
*H01M 4/525* (2010.01)
*H01M 10/0525* (2010.01)
*F27D 19/00* (2006.01)

(52) U.S. Cl.
CPC ........ *H01M 4/525* (2013.01); *H01M 10/0525* (2013.01); *F27D 2007/063* (2013.01); *F27D 2019/0006* (2013.01)

(58) Field of Classification Search
CPC ... H01M 10/052; H01M 10/0525; F27D 7/06; F27D 2007/063; F27D 2019/0006
See application file for complete search history.

(56) References Cited

U.S. PATENT DOCUMENTS

2016/0372748 A1* 12/2016 Nakayama ............ H01M 4/485
2017/0054147 A1     2/2017 Yokoyama et al.

FOREIGN PATENT DOCUMENTS

| | | |
|---|---|---|
| JP | 2018193296 | 12/2018 |
| WO | 2020137440 | 7/2020 |

OTHER PUBLICATIONS

Arumugam Manthiram, et al, "Nickel-Rich and Lithium-Rich Layered Oxide Cathodes: Progress and Perspectives", Advanced Energy Materials, 6, 2016, 1-23.

Yang-Kook Sun, et al, "Nanostructured high-energy cathode materials for advanced lithium batteries", Nature Materials, 11, 2012, 1-6.

Yang-Kook Sun, et al, "High-energy cathode material for long-life and safe lithium batteries", Nature Materials, 8, 2009, 320-324.

M.H. Lee, et al, "Synthetic optimization of Li[Ni1/3Co1/3Mn1/3]O2 via co-precipitation", Electrochimica Acta, 50, 2004, 939-948.

Andrew Van Bommel, et al, "Analysis of the Growth Mechanism of Coprecipitated Spherical and Dense Nickel, Manganese, and Cobalt-Containing Hydroxides in the Presence of Aqueous Ammonia", Chem. Mater., 21, 2009, 1500-1503.

"Comparison Common Lithium Technologies", Incell Academy, Incell International AB, Sweden, 1-6.

"The Advanced Atmosphere Control System—A smooth finisher", Air Products and Chemicals, Inc., 2016, 1-2.

Guido Plicht, et al, "Innovative atmosphere control system for annealing furnaces", Air Products and Chemicals, Inc., 2019, 1-8.

Guido Plicht, et al, "Advanced Atmosphere Control System for Improving Annealing Steel Components", Air Products and Chemicals, Inc., 2000, 1-8.

* cited by examiner

FURNACE ATMOSPHERE CONTROL FOR LITHIUM-ION BATTERY CATHODE MATERIAL PRODUCTION

CROSS REFERENCE TO RELATED APPLICATIONS

This application is a divisional of, and claims the priority of, U.S. patent application Ser. No. 17/314,505 filed May 7, 2021, which is incorporated by reference herein in its entirety.

BACKGROUND

Increasing demand for technologies to reduce the emission of greenhouse gases, such as carbon dioxide, has created a need for the development of alternative means of clean energy collection and storage. A significant reduction in carbon dioxide emissions can be achieved, for example, via the electrification of mobility.

Rechargeable lithium-ion batteries (LIBs) have been widely used in consumer electronic devices and are quickly entering the electric vehicle (EV) and large-scale stationary energy storage market. The state-of-the-art LIB system typically consists of a graphite anode, a separator, aqueous electrolyte, and a lithium-containing cathode. The cathode materials determine the energy density and voltage of the battery, so there is intensive exploration of cathode materials to further improve the energy density of the whole battery system.

Traditional cathodes, such as $LiCoO_2$, $LiMn_2O_4$, $LiFePO_4$, and $LiNi_xMn_yCo_zO_2$(NMC) have been commercially used as cathode materials for LIBs. Among these chemistries, Ni-rich $LiNi_xMn_yCo_zO_2$, where $x \geq 0.5$, or Ni-rich NMC, has been regarded as a promising cathode material, particularly in the EV market. Ni-rich NMC exhibits a high achievable discharge capacity (200-220 mAh g−1), representing a further enhancement in energy density (~800 Wh kg−1) in comparison to traditional cathodes. See, for example, W. Liu, et al., *Angew. Chem. Int. Ed.* 54 (2015) 4440-4457; A. Manthiram, et al., *Adv. EnergyMater.* 6 (2016); Y.-K. Sun, et al., *Nat. Mater.* 11 (2012) 942-947 and Y.-K. Sun, et al., *Nat. Mater.* 8 (2009) 320-324.

Increasing the nickel content (>0.5 mole fraction) in the cathode material imposes a requirement for the use of oxygen as the calcination furnace atmosphere to enable the full oxidation of metals building chemistries like Lithium Nickel Manganese Cobalt (NMC) and Lithium Nickel Cobalt Aluminum (NCA), Lithium Nickel Manganese Cobalt Aluminum (NMCA), Nickel Cobalt Boron (NCB).

Although these cathode materials exhibit very attractive energy densities, their electrochemical performance is very sensitive to the synthesis method and post-calcination treatment conditions. The synthesis methods widely used for preparation of these cathode materials include precursor preparation, Lithium source mixing and a calcination step at high temperatures ranging from 700-1050 degrees Celsius. See, for example, M. H. Lee, et al., *Electrochim. Acta* 50 (2004)939-948 and A. van Bommel, et al., *Chem. Mater.* 21 (2009) 1500-1503.

Understanding and controlling the oxygen-rich furnace atmosphere during the calcination step is critical for providing high quality Ni-rich cathode materials. Careful control of the atmosphere during the calcination process can produce Ni-rich cathode material with improved performance and operational lifetime, as well as reducing the cost of the cathode manufacturing process.

Existing atmosphere control systems for heat treatment processes in other industries are used with inert atmospheres and some reactive atmospheres, for example, argon, nitrogen, hydrogen, ammonia, natural gas or blends thereof. These heat treatment processes typically aim to avoid oxidation and decarburization by reducing the oxygen or water content of the atmosphere. In contrast, the production of high-quality Ni-rich cathode material requires calcination of the precursors at relatively high temperatures in a strongly oxidizing atmosphere.

Therefore, there is a need for effective, reliable and cost-effective equipment and methods for the monitoring and control of the oxygen-rich atmospheres needed in industrial scale calcination furnaces for the production of Ni-rich cathode material.

SUMMARY

Described herein are a method and apparatus that comprise an atmosphere control system. The atmosphere control system is designed to control an oxygen-rich atmosphere in a calcination furnace for the production of high-quality Ni-rich cathode material for lithium ion and other solid-state batteries. The calcination process preferably takes place in a furnace with multiple temperature zones. Preferably there are at least three zones, a preheating zone where cathode precursor material enters the furnace and is heated from ambient temperature to a desired processing temperature. During the preheating process, impurities (moisture, carbon dioxide and other harmful impurities) are driven off in gaseous form. The material then moves from the preheating zone to the hot zone of the furnace. The calcinated material is then moved from the hot zone to a cooling zone before exiting the furnace.

The atmosphere control apparatus preferably comprises three main components, (1) a network of sensors installed in the multiple temperature zones of the furnace; (2) an oxygen delivery system comprising mass flow controllers that, when connected to a source of oxygen, is cable of providing variable flows of oxygen into the multiple temperature zones; and (3) a process control system capable of communicating with and controlling the sensors and the oxygen delivery system. The apparatus may be incorporated into the design of new furnaces or installed as a retrofit to existing furnaces.

The method comprises using the atmosphere control apparatus to monitor and adjust the atmosphere of the multiple temperature zones of the furnace so that the hottest zone of the furnace, where the cathode material is finally formed, has a relatively clean, oxygen-rich atmosphere with very low level of impurities (moisture, carbon dioxide and other harmful impurities) compared to the preheating zone. The flow of oxygen-rich process gas into the various zones is adjusted to create movement of the furnace atmosphere away from the hot zone and towards the entrance and exit of the furnace. This maintains a high purity oxygen-rich atmosphere in the hot zone and minimizes undesirable side reactions between materials and harmful impurities (moisture and carbon dioxide) in the hot zone.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspect 1: A method of furnace atmosphere control for a calcination furnace for the production of a lithium ion battery cathode material, the method comprising the steps of:
- (a) measuring a first oxygen concentration, a first moisture concentration and a first carbon dioxide concentration of an atmosphere inside a first zone of the calcination furnace;
- (b) measuring a second oxygen concentration, a second moisture concentration and a second carbon dioxide concentration of an atmosphere inside a second zone of the calcination furnace, wherein the second zone adjoins the first zone and a border between the first and second zones is located where a temperature of the atmosphere reaches a predetermined soaking temperature;
- (c) supplying an oxygen process gas comprising at least 50 percent oxygen by volume, independently, to the first and second zones of the calcination furnace;
- (d) controlling a flow rate of a first stream of oxygen process gas into the first zone as a function of at least one selected from the group of (i) the first oxygen concentration measured in step (a), (ii) the first moisture concentration measured in step(a), and (iii) the first carbon dioxide concentration measured in step (a);
- (e) controlling a flow rate of a second stream of oxygen process gas into the second zone as a function of at least one selected from the group of (i) the second oxygen concentration measured in step (b), (ii) the second moisture concentration measured in step (b), and (iii) the second carbon dioxide concentration measured in step (b); and
- (f) maintaining the flow rate of the first stream of oxygen process gas at or below the flow rate of the second stream of oxygen process gas, to prevent to prevent a gaseous flow from the first zone into the second zone.

Aspect 2: The method of Aspect 1, wherein step (d) further comprises increasing the flow rate of the first stream of oxygen process gas if at least one selected from the group of (i) the first oxygen concentration measured in step (a) is less than a predetermined setpoint, (ii) the first moisture concentration measured in step(a) is greater than a predetermined set point, and (iii) the first carbon dioxide concentration measured in step (a) is greater than a predetermined set point.

Aspect 3: The method of any of Aspects 1-2, wherein step (e) further comprises increasing the flow rate of the second stream of oxygen process gas if at least one selected from the group of (i) the second oxygen concentration measured in step (b) is less than a predetermined setpoint, (ii) the second moisture concentration measured in step (b) is greater than a predetermined setpoint, and (iii) the second carbon dioxide concentration measured in step (b) is greater than a predetermined set point.

Aspect 4: The method of any of Aspects 1-3, further comprising:
- (h) repeating steps (a) through (f) while simultaneously heating, gradually, the first zone to a first temperature and maintaining the second zone at a second temperature, wherein the second temperature is greater than or equal to the first temperature.

Aspect 5: The method of any of Aspects 1-4, further comprising:
- (i) repeating steps (a) through (f) while simultaneously feeding a quantity of lithium ion battery cathode precursor material into the first zone for a time period sufficient to heat the material to a predetermined material temperature, then feeding the material into the second zone.

Aspect 6: The method of any of Aspects 1-5, further comprising:
- (j) measuring a third oxygen concentration, a third moisture concentration and a third carbon dioxide concentration of an atmosphere inside a third temperature zone of the furnace, wherein the third temperature zone adjoins the second temperature zone;
- (k) controlling a flow rate of a third stream of oxygen process gas into the third zone as a function of at least one selected from the group of (i) the third oxygen concentration measured in step (j), (ii) the third moisture concentration measured in step (j), and (iii) the third carbon dioxide concentration measured in step (j); and
- (l) maintaining the flow rate of the third stream of oxygen process gas at or below the flow rate of the second stream of oxygen process gas, to prevent to prevent a gaseous flow from the third zone into the second zone.

Aspect 7: The method of any of Aspects 1-6, wherein the lithium ion cathode precursor material is selected from the group consisting of precursors for: lithium nickel manganese cobalt (NMC); lithium nickel cobalt aluminum (NCA); lithium nickel manganese cobalt aluminum (NMCA); nickel cobalt boron (NCB) and combinations thereof.

Aspect 8: The method any of Aspects 1-7, wherein the cathode precursor material comprises a mole ratio of nickel greater than 0.5.

Aspect 9: The method of any of Aspects 1-8, wherein the oxygen process gas comprises a purity of at least 90 percent by volume.

Aspect 10: The method of any of Aspects 1-9, further comprising:
- (m) withdrawing a sample of furnace atmosphere from the first zone through a sample line; and
- (n) delivering the sample to at least one external analyzer configured to measure a parameter selected from the group consisting of: oxygen concentration; carbon dioxide concentration, dew point, ammonia, SOx and NOx.

Aspect 11: A method of furnace atmosphere control for a calcination furnace for the production of a lithium ion battery cathode material, the method comprising the steps of:
- (a) measuring a first oxygen concentration of an atmosphere inside a first zone of the calcination furnace;
- (b) measuring a second oxygen concentration inside a second zone of the calcination furnace, wherein the second zone adjoins the first zone and a border between the first and second zones is located where a temperature of the atmosphere reaches a predetermined soaking temperature;
- (c) supplying an oxygen process gas comprising at least 50 percent oxygen by volume, independently, to the first and second zones of the calcination furnace;
- (d) controlling a flow rate of a first stream of oxygen process gas into the first zone as a function of the first oxygen concentration measured in step (a);
- (e) controlling a flow rate of a second stream of oxygen process gas into the second zone as a function of the second oxygen concentration measured in step (b); and
- (f) maintaining the flow rate of the second stream of oxygen process gas at or below the flow rate of the first stream of oxygen process gas, to prevent to prevent a gaseous flow from the second zone into the first zone.

Aspect 12: An apparatus for controlling the atmosphere inside a calcination furnace for the production of lithium ion or solid state battery cathode material comprising:

- a first sensor group, installed in a first furnace temperature zone, the first sensor group comprising a first oxygen sensor, a first moisture sensor and a first carbon dioxide sensor;
- a second sensor group, installed in a second furnace temperature zone, the second sensor group comprising a second oxygen sensor, a second moisture sensor and a second carbon dioxide sensor;
- an oxygen delivery system operationally configured be placed in fluid flow communication with a source of oxygen to deliver independently regulated streams of oxygen to the first and second furnace temperature zones;
- a process controller operationally configured to communicate with the sensors and oxygen deliver system to control the delivery rate of oxygen to the first and second temperature zones in response to signals from the first and second sensor groups.

Aspect 13: The apparatus of Aspect 12, further comprising a first sampling line operationally configured to withdraw a sample of the atmosphere from inside the first temperature zone of the furnace and deliver it to a first external sensor; the first external sensor operationally configured to communicate with the process controller.

Aspect 14: The apparatus of any of Aspects 12-13, wherein the first oxygen sensor is an in-situ sensor.

Aspect 15: The apparatus of any of Aspects 12-14, wherein the first external sensor is a sensor for measuring a parameter selected from the group consisting of: oxygen, pressure, dew point, carbon dioxide, ammonia, SOx, NOx and differential pressure.

Aspect 16: The apparatus of any of Aspects 12-15, wherein the first sampling line comprises a moisture removal device operationally configured to remove moisture from the sample of furnace atmosphere.

Aspect 17: The apparatus of any of Aspects 12-16, wherein the first furnace zone comprises an upper region and a lower region; the first oxygen sensor being positioned the upper region and an inlet configured to deliver oxygen from the oxygen delivery system positioned in the lower region.

Aspect 18: The apparatus of any of Aspects 12-17, wherein the first sampling line passes through a furnace wall; the sampling line comprising an interior length formed from a ceramic material and positioned inside the furnace wall, and an exterior length form from stainless steel and positioned outside the furnace wall.

Aspect 19: The apparatus of any of Aspects 12-18 wherein the first sensor group and the first external sensor are operationally configured to communicate with a first sensor node; the first sensor node operationally configured to communicate with the process controller.

Aspect 20: The apparatus of any of Aspects 12-19 wherein the first sensor group further comprises a first gas flow velocity sensor and the second sensor group further comprises a second gas flow sensor.

DETAILED DESCRIPTION OF INVENTION

Figure 1:
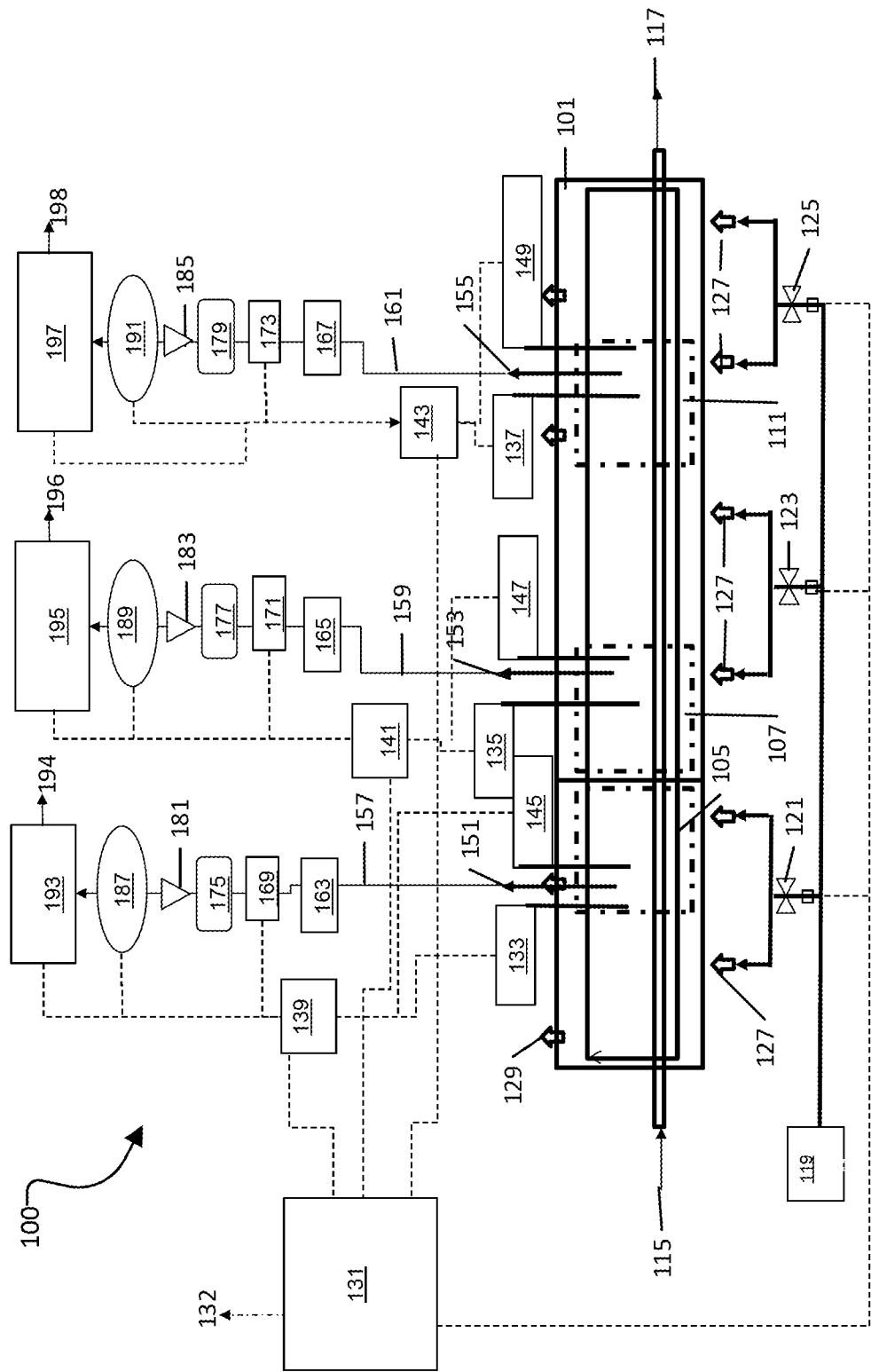
FIG. 1 is a schematic of an industrial scale calcination furnace equipped with an atmosphere control system according to an embodiment of the invention.

The ensuing detailed description provides preferred exemplary embodiments only, and is not intended to limit the scope, applicability, or configuration of the claimed invention. Rather, the ensuing detailed description of the preferred exemplary embodiments will provide those skilled in the art with an enabling description for implementing the preferred exemplary embodiments of the claimed invention. Various changes may be made in the function and arrangement of elements without departing from the spirit and scope of the claimed invention.

Reference numerals that are introduced in the specification in association with a drawing figure may be repeated in one or more subsequent figures without additional description in the specification in order to provide context for other features.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

As used herein the term "furnace" and "calcination furnace" refers to an apparatus used to heat treat solid precursor materials to form a lithium-ion cathode material. The heat treating processes temperatures preferably range from 700 to 1300 degrees Celsius.

As used herein the terms "temperature zone", "heating zone", and "zone" refer to a region inside a furnace that is associated with a defined furnace temperature profile. Material that is being heat treated moves through the zones as it is being treated. A zone may have a constant temperature or a temperature gradient. The boundaries between zones may be defined spatially or in terms of a temperature. The boundaries between zones may be sharp or gradual depending on a particular furnace design and application.

As used herein the term "NMC" refers to a material having the general chemical formula $LiNi_xMn_yCo_zO2$. The term "Ni-rich NMC" refers to a material having the general chemical formula $LiNi_xMn_yCo_zO2$ where the value of x is greater than 0.5. The term "NMC 811" refers to a material having the chemical formula $LiNi_{0.8}Mn_{0.1}Co_{0.1}O_2$.

As used herein, the term "precursor" refers to raw materials, in an unreacted state, used in the production of cathode material. Preferred cathode materials, including but not limited to, NCA and NMC, are produced through co-precipitation of transition-metal hydroxide precursor materials, followed by calcination (lithiation and oxidation) with a lithium compound, preferably lithium hydroxide. In a preferred embodiment, the precursor is $NixMnyCo(1-x-y)(OH)2$ and the cathode material it yields upon calcination is NMC.

As used herein the term "communication" refers to the ability to transmit and receive information, data, signals, controls, commands via any known technology. For example, the communication between the components of the disclosed atmosphere control system may be conducted by one or more technology including, but not limited to, fixed electrical wiring or a wireless network, such as a Local Area Network (LAN), a Wireless Local Area Network (WLAN), a Wide Area Network (WAN), a Personal Area Network (PAN), a Wireless Personal Area Network (WPAN), a telephony network such as a cellular network or a circuit switched network, an intranet, extranet, peer-to-peer network, virtual private network (VPN), the Internet, or other communications network/link.

The production of Ni-rich cathode material, such as NMC, requires calcination in an oxygen-rich atmosphere (oxygen content in atmosphere >50%). Preferably, the oxygen content of the calcination furnace atmosphere is 70 percent (by volume) or greater, more preferably 90 percent (by volume) or greater. Previous cathode chemistries (with Nickel less than 0.5 mole fraction) could have been calcinated in air, which is known to contain 21 percent (by volume) of oxygen, or in oxygen-rich atmospheres. The disclosed invention works for all atmospheres mentioned above.

Research conducted on blends of nitrogen-oxygen atmospheres for the calcination of NMC containing greater than 0.5 mole fraction nickel chemistries has shown that low oxygen content in the gas blend results in poor electrochemical and cycle performance of the resulting cathode material. This correlation is attributed to the oxidation state of nickel in the product and the size of its atomic radius.

Various metals, depending on their atomic group and number of electron shells can achieve different oxidation levels. In the case of nickel, the most stable cation is $Ni^{2+}$, which can be detrimental to the performance of cathode material. Its negative impact comes from a being very close in the size of its atomic radii to $Li^+$, and their mixing within the crystal structure. According to Le Chatelier's principle, increasing the partial pressure of oxygen in the furnace atmosphere allows for more oxygen to be available to oxidize nickel to its preferred higher oxidation state, $Ni^{3+}$.

In light of these findings, current calcination processes supply oxygen to the furnace at a fixed flow rate, assuming that a high fixed flow rate of oxygen is sufficient to oxidize the cathode material. Little to no attention is given to this important aspect of the process, effectively making inefficient use of the protective atmosphere potential and its impact on the final product. Additionally, process impurities, including, but not limited to, carbon dioxide ($CO_2$) and moisture ($H_2O$) can have a reverse effect on oxidation, and lead to side reactions with lithium. Careful monitoring and reduction of these impurities must be strictly controlled.

In addition to the furnace atmosphere composition, the furnace gas flow direction and velocity are also important. Preferably, the calcination process is carried out in a continuous furnace where crucibles containing the precursors are transported through multiple temperature zones. The temperature zones and their boundaries are dependent on the furnace design and the process being performed. In general, the furnace comprises three main zones: preheating, hot (soaking) and cooling. The preheating zone is the section of the furnace where any part or material gradually increases its temperature from starting temperature (most commonly ambient) until it reaches the 'soaking temperature'. The hot zone of the furnace is the section where the temperature is most stable and should be rather 'constant' or maintained close to desired soaking temperature (defined specifically for the type of processed material). The cooling zone is where the product is being cooled down with the desired cooling rates (always material & properties specific) across the length of the zone.

Preferably, the depth of precursor material inside the crucible is relatively small, to provide sufficient contact between the furnace atmosphere and the precursor material. The invented atmosphere control system optimizes the furnace atmosphere flow pattern and composition to ensure more effective reaction between precursor material and the oxygen-rich atmosphere, in part, by measuring flow direction and velocity of furnace atmosphere.

Preferably, the process gas is injected on the cooling side of the hot zone with the goal of forcing most of the gas flow towards entrance of the furnace (against the direction of belt movement) and allowing some of the flow to be distributed towards the cooling zone and protecting the parts where they may be affected the most.

In an embodiment for the calcination process of NMC, the gas inlets (located on the bottom side of the furnace) are located across the whole length of the furnace although the flow distribution is not even between those inlets. The majority of gas is introduced in the cooling end and also is forced to exit the furnace in the preheating section of the furnace. Most of the chemical reactions between material and atmosphere take place in the preheating zone and partially in the hot zone. It is important to remove the impurities released from the material as quickly as possible and having the gas outlets in the 'dirtiest' section of the furnace helps with preventing those impurities from getting into the hot section and reversing the chemical reactions.

It is important, however, to not only remove the impurities from the furnace as quickly as possible, but also to allow sufficient partial pressure of oxygen process gas in the furnace for the material to oxidize and distribute this across in the furnace in a way that the material has more uniform exposure to the oxidizing atmosphere.

In embodiments, the direction of atmosphere flow in the furnace is determined by measurement of differential pressures between different sections of the furnace and between the furnace and the exterior atmosphere. In normal operation the pressure in the furnace is preferably slightly positive against atmospheric pressure and uniform across the furnace (low differential). This is directly linked to the flow of the gas into the furnace. Increases in the differential pressure between specific furnace sections shows that the flow isn't distributed uniformly or that there has been an air ingress from one furnace end depending on the direction of change in the pressures.

In an embodiment, the invented atmosphere control system continuously measures and analyzes oxygen, $CO_2$, $H_2O$, furnace pressure, furnace atmosphere flow direction and flow velocity in each zone within the calcination furnace. Other parameters may also be measured as needed depending on the type of material being processed. The other parameters may include, but are not limited to, impurities such as sulfur oxides (SOx) and nitrogen oxides (NOx).

A process controller in communication with the sensors (directly to each sensor or to groups of sensors via a node) is also in communication with an oxygen delivery system. The oxygen delivery system comprises mass flow controllers at the inlets to each furnace zone. The oxygen delivery system is in fluid flow communication with a source of oxygen and is configured to optimize the oxygen flow in each furnace zone in order to maintain a high oxygen concentration, displace $CO_2$, $H_2O$ and other impurities, and maintain a desired atmosphere flow direction. Preferably, the furnace will have at least three zones, a preheating zone, a hot zone and a cooling zone.

Furnace pressure and gas velocity sensors are installed at selected positions to monitor the furnace atmosphere flow pattern, which helps to maintain a high oxygen level inside the furnace by effectively displacing moisture, carbon dioxide and impurities through vents in the furnace walls. Parameters including, but not limited to, temperature, oxygen concentration, moisture (measured as dew point) and CO2 concentration are preferably used to both verify that the calcination furnace atmosphere is running at optimal conditions, and to determine the optimal operation of the calcination furnace atmosphere control system by correlating the atmospheric conditions with the quality of the finished cathode material.

FIG. 1 shows an embodiment of a furnace atmosphere control system 100 for a calcination furnace 101 used in the production of Ni-rich lithium ion battery cathode material. For the sake of clarity, not all possible configurations or measurement locations are shown, but in view of the options shown, different configurations that are part of the invention can be put together. The furnace comprises a plurality of consecutive heating and cooling zones which are maintained at different temperatures, with each zone being equipped with an array of sensors. In the embodiment of FIG. 1, the furnace comprises at least one of each of a preheating zone 105, a hot zone 107, and a cooling zone 111.

Cathode precursor material 115 enters the furnace at the preheating zone 105 and is subsequently transported through the hot zone 107, and then the cooling zone 111, to emerge as finished cathode material product 117. The preheating step, in addition to raising the temperature of the raw materials, drives off moisture, carbon dioxide and other impurities that are mainly produced from the decomposition of precursors. The moisture, CO2 and impurities are preferably removed from the materials before they enter the hot zone where they can cause undesirable reverse reactions.

A source of oxygen is connected to the oxygen delivery system 119. The source is preferably an oxygen-rich gas blend. Preferable gas blends include, but are not limited to, a mixture of O2 and N2, purified air or combinations thereof. In an embodiment, the gas mixture contains at least 50 percent by volume O2, preferably at least 70 percent by volume O2, more preferably at least 90 percent by volume O2. Preferably, the oxygen-rich gas blend has a CO2 concentration less than 1 ppm, CO concentration less than 1 ppm, H2O concentration less than 5 ppm, total hydrocarbon concentration less than 1 ppm, and is substantially free of metal particles, oil or grease. Preferably, the balance of impurities in the oxygen-rich gas blend are argon and nitrogen, which are inert at the process temperature and should not have a negative impact on the processed materials.

Referring to FIG. 1, the oxygen delivery system 119 is in fluid flow communication with the mass flow controllers, 121, 123, 125 that feed oxygen-rich gas blend into the furnace via inlets 127. The mass flow controllers are in electrical communication with the main flow controller's 131 software logic. The mass flow controllers are adjusted based on the signal from the main flow controller to allow for more or less restricted flow by proportional control of the flow of the gas flowing through the mass flow controllers. Preferably, the inlets are located at the bottom of the furnace or on the side walls of the furnace, or both. Gases, including water vapor, CO2 and other impurities driven off from the precursor materials exit the furnace via outlets 129 in the top of the furnace. Preferred sources of oxygen include, but are not limited to a liquid oxygen storage tank and/or a vacuum swing adsorption (VSA) oxygen generator. In embodiments, the oxygen from the liquid oxygen storage tank or VSA oxygen generator is mixed with purified air, or pure nitrogen. When mixing oxygen with pure nitrogen, the nitrogen can be from a liquid nitrogen tank or PSA nitrogen generator.

The mass flow controllers 121, 123, 125 on the gas inlets are in communication with the central process controller 131. Referring to the embodiment shown in FIG. 1, the hot zone 107 has fewer gas outlets 129 than the preheating zone 105 and the cooling zone, 111 to promote the flow of furnace atmosphere from the hot zone to the adjacent zones. Preferably, most of the oxygen flows towards the front end of the furnace, against the direction in which the cathode material travels. This design facilitates the attainment of the most oxygen-rich atmosphere and fewest impurities in the hot zone of the furnace, where these parameters are the most critical.

Oxygen sensors 133, 135, 137 are located at measurement points in the furnace. Preferable oxygen sensors are zirconia probes, paramagnetic probes, electrochemical analyzers or any other oxygen sensor suitable for measuring oxygen in a highly oxidizing atmosphere. Preferably, the oxygen sensors are positioned to measure the oxygen concentration in the atmosphere of each furnace zones. The oxygen sensors are preferably placed in close proximity to the solid material being heat treated to provide a measurement of the atmosphere that is exposed to the material. In embodiments, each zone will have more than one oxygen sensor, and more than one set of other sensors, installed at different locations within the zone. The embodiment shown in FIG. 1, is provided as an example in which each zone has one set of sensors, to simplify the figure. This applies to the other types of sensors also. In an embodiment, additional oxygen sensor(s) (not shown) can be added and positioned in the main oxygen-rich gas supply line and the main furnace outlet (vent) line. The purpose is to measure the concentration of oxygen in the supply line and in the main outlet line (after the calcination process). The additional oxygen sensors are also in communication with the process controller via wireless nodes or direct electrical connection to the process controller. The purpose of installing these sensors is to measure the oxygen concentration before and after the calcination process. These measurements will allow for calculations to determine how much oxygen was used in the process and use this data for thermodynamic analysis of the process and enhanced process control.

Referring to the embodiment of FIG. 1, a first oxygen sensor 133 is positioned in a preheating zone 105 of the furnace, a second oxygen sensor 135 is positioned in a hot zone 107 of the furnace and a third oxygen sensor 137 is located in a cooling zone 111. Sensor nodes 139, 141, 143 for each zone receive the signals from the oxygen sensors 133, 135, 137 and are in turn in communication with a central process controller 131. The main process controller may be equipped with a cloud-based data logging system 132. In an embodiment (not shown) oxygen sensors are located outside the furnace in the sampling line, discussed below.

More oxygen sensors can be added to the system to measure oxygen concentration at other furnace locations, i.e. gas supply line and furnace vent line. They communicate with process controller via wireless nodes or direct electrical connection to the process controller.

Sensors for measuring flow direction and velocity 145, 147,149 are positioned in each of the preheating 105, hot 107 and cooling 111 zones. The flow direction and velocity sensors 145, 147,149 are electrically connected to the nodes 139, 141, 143 for their respective zones, and the nodes are in communication with the central process controller.

Sampling lines 151, 153, 155 are located in each of the preheating 105, hot 107 and cooling 111 zones. The sampling lines allow for a sample of the atmosphere in each zone to be withdrawn from the furnace for analysis by external sensors for measuring dew point and impurities. A section of each sampling line 151, 153, 155 extends through the top furnace wall, and has an opening exposed to the interior of the furnace. The internal section is preferably constructed of ceramic material. Another section of the sampling line extends form the first section to an array of monitoring devices. This external section of sampling line 157, 159, 161 is preferably constructed of a thermally conductive material, including but not limited to stainless steel, so that it may be heated to avoid condensation in the sampling line. Preferably all the materials used in the sampling line are compatible for use with oxygen and cleaned to appropriate conditions.

A pump 175, 177, 179 is used to a draw sample of the atmosphere through the sampling line 157, 159, 161 and into a train of sensors. A filter 163, 165, 167 is located on each sampling line to remove any particulate matter in the sample.

A dew point sensor 169, 171, 173 measures the dew point of the atmosphere sample. After the dew point analyzer, a condensation cup 181, 183, 185 removes moisture from the sample prior to a CO2 analyzer 187, 189, 191 and sensor array 193, 195, 197. The sensor array preferably includes sensors for measuring pressure and impurities including, but not limited to, ammonia, SOx and NOx. After passing through the sensor array 193, 195, 197, the sample is vented 194, 196, 198 to a safe location.

A node 139, 141, 143 for each furnace zone receives the signals from the sensor array 193, 195, 197, CO2 analyzer 187, 189, 191, dew point sensor 169, 171, 173, oxygen sensor 133, 135, 137 and flow sensor 145, 147, 149 for that zone of the furnace. Each node is in communication with to the central process controller. The central process controller receives and processes the signals from all the sensors and adjusts the flow of oxygen into each zone by communicating with and controlling the mass flow controllers 121, 123, 125.

Figure 2:
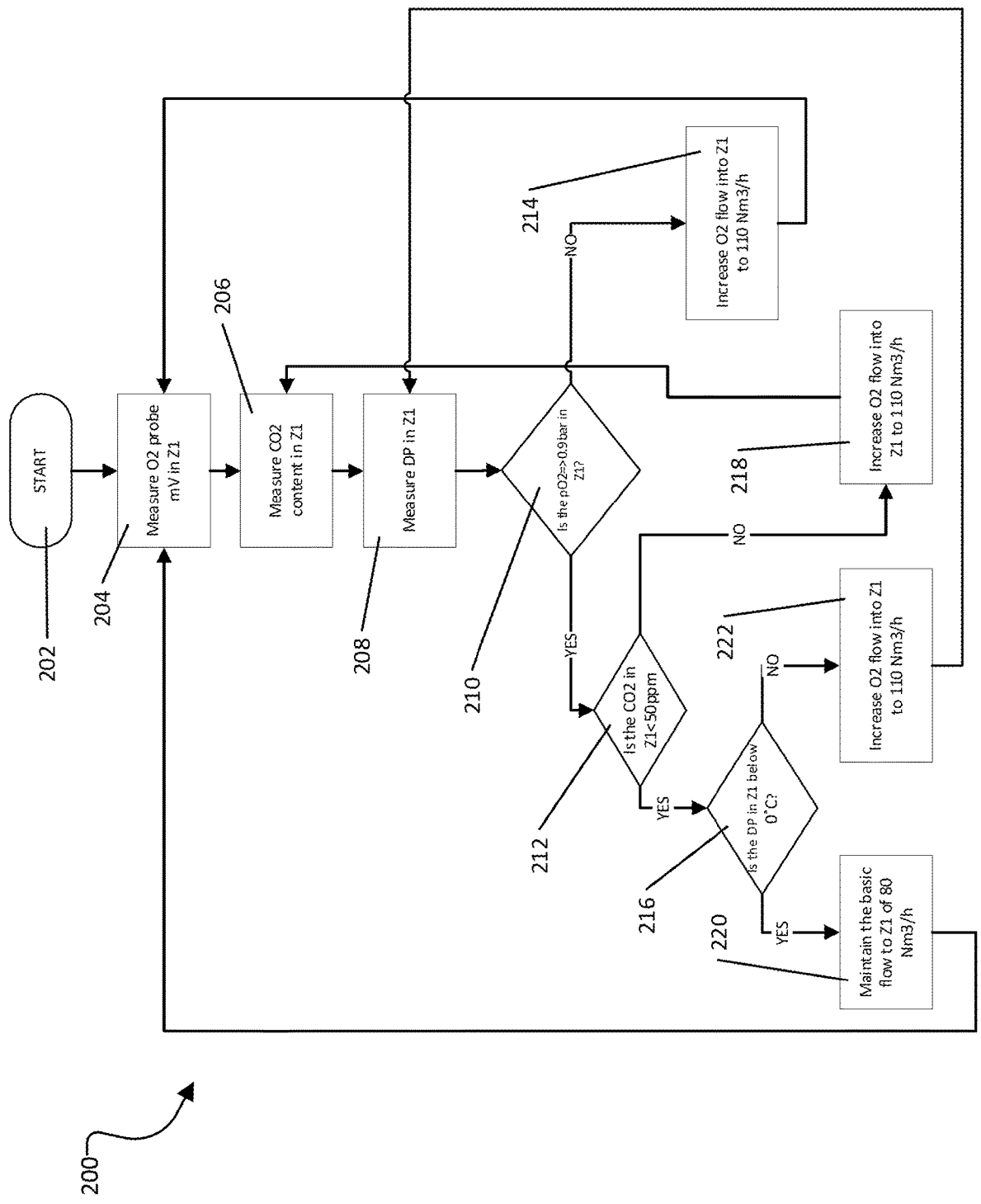
FIG. 2 is a flow chart showing the control logic for an exemplary furnace zone in an embodiment of the invention.

FIG. 2 provides an exemplary embodiment of the process control logic 200 for an individual furnace zone. The control steps can be performed as a discrete sequence or as a continuous loop. It should be noted that the control logic 200 is purely exemplary. There are many other possible control logics that could improve the performance of calcination furnaces for the production of Ni-rich cathode material.

At the start of a sequence 202, measurements are taken from the oxygen sensor 204, CO2 sensor 206 and dew point sensor 208. The measurements are then compared to preset values. The preset values may be selected by the operator or may be chosen and varied by the main process controller in response to readings from other zones to optimize the atmospheric conditions inside the furnace.

FIG. 2 provides an example of the setpoints of one embodiment to illustrate the invention. In the practice of the invention, these setpoints will vary and are selected by a process engineer. The setpoints are tailored to a specific furnace design and a specific processing application. The setpoints also will vary between furnace zones.

In the embodiment illustrated in FIG. 2 the oxygen measurement is taken as a partial pressure of oxygen (pO2) and is compared to a setpoint of 0.9 bar 210. When the pO2 is equal to or lower than 0.9 bar, the process controller will signal the oxygen mass flow controller for that zone to increase the flow of oxygen into the zone 214. The system will continue to read the oxygen measurement of the oxygen sensor 204 until the reading is greater than 0.9 bar 210. As used herein, 0.9 bar is equivalent to an oxygen concentration of 90% by volume of oxygen, assuming the total furnace pressure to be approximately 1 bar for simplicity. The flow controllers preferably are capable of proportional control to enable a more accurate flow adjustments proportional to deviation from a setpoint.

When the oxygen reading 210 is greater than the setpoint, in this case, 0.9 bar, the controller will then compare the measurement of the CO2 sensor with a preset value, in this case 50 ppm 212. If the CO2 concentration is equal to or greater than 50 ppm, the process controller will signal the oxygen mass flow controller for that zone to increase the flow of oxygen into the zone 218. The system will continue to read the carbon dioxide measurement of the sensor 206 until the increased oxygen flow has displaced enough CO2 to bring the reading below 50 ppm 212.

When the pO2 is above the setpoint and the CO2 reading is below the setpoint, in this case, 50 ppm, the controller will compare the measurement of the dew point sensor with a setpoint, in this case 0 degrees Celsius 216. When the dewpoint is equal to or greater than 0 degrees Celsius, the process controller will signal the oxygen mass flow controller for the zone to increase the flow of oxygen into the zone 222. The system will continue to read the dew point measurement of the sensor 220 until the increased oxygen flow has displaced enough moisture to bring the reading below 0 degrees Celsius.

When the pO2 is above the setpoint and the CO2 and dew point measurements are below the setpoint, the controller will maintain the flow of oxygen into the zone. Analogous closed loop control logic is used with the array of sensors for pressure and other impurities. The main process controller is configured with software to simultaneously monitor the readings of all the sensors in each zone and to manipulate the mass flow controllers to optimize the atmosphere within the furnace. The setpoints for the parameters in each zone may be different and may be dynamically adjusted by the main process controller in response to sensor measurements.

Differential pressure and/or temperature measurements can be taken at various points. Such measurements on a vent flow can indicate both flow direction and flow rate. Such measurements between the furnace and vent flow, or between two furnace locations, can similarly indicate flow direction and/or flow rate.

EXAMPLES

Thermal Gravimetry Analysis (TGA) was performed on NMC 811 precursor mixed with two lithium sources, lithium hydroxide (LiOH) and lithium carbonate (Li2CO3) that are used for preparation of cathode material. This test was conducted in order to understand the behavior of these chemistries under oxygen (oxidizing reactions) and temperature to get better understanding of the material decomposition upon temperature profiling.

Example 1

NMC 811 Precursor and LiOH

A 18.8070 mg quantity of NMC811 precursor and LiOH mixture (molar ratio 1:1) were placed into the TGA instrument (TGA Q500, TA Instrument, New Castle, Delaware). The temperature was increased from 50 degrees Celsius to 900 degrees Celsius in an atmosphere comprising 98 percent by volume of oxygen and 2 percent by volume of nitrogen. The process gas (oxygen supply) flow was set to 50 ml/min. The temperature was held for 30 minutes at 50 degrees Celsius, followed by a heating ramp of 3 degrees Celsius per minute to 900 degrees Celsius. Then the material was held at 900 degrees Celsius for 20 minutes. The material was then cooled to room temperature. The reaction in the furnace using LiOH as Li source is 4Ni0.8Mn0.1Co0.1O+4LiOH+ O2 à 4LiNi0.8Mn0.1Co0.1O2+2H2O. The results of Example 1 are summarized in Table 1.

TABLE 1

TGA Analysis Results of NMC 811 precursor and LiOH

| No | Temperature Range (° C.) | Weight Loss Amount (wt %) | Gaseous components attributed to the weight loss |
|---|---|---|---|
| 1 | 167 to 267 | 10.40 | $H_2O$ |
| 2 | 267 to 459 | 4.65 | $H_2O$ |
| 3 | 459 to 728 | 1.38 | $H_2O$ |
| 4 | 728 to 900 | 0 | N/A |

The results in Table 1 show that the removal of water from the precursor material occurred in stages at lower temperatures, before the material reached the maximum process temperature of 900 degrees Celsius Example 2

NMC 811 Precursor and Li2CO3

A 33.9230 mg quantity of NMC811 precursor and Li2CO3 mixture (molar ratio 2:1) were placed into the TGA equipment (same as above). The material was first held at room temperature for 30 minutes. The temperature was then increased from room temperature to 950 degrees Celsius at a rate of 3 degrees Celsius per minute. Throughout the process the material was under an atmosphere of 98 percent by volume of oxygen and 2 percent by volume of nitrogen, at a gas flow rate of 50 ml/min. The reaction in the furnace using Li2CO3 as Li source: 2Ni0.8Mn0.1Co0.1O+ 2Li2CO3+O2 à 2LiNi0.8Mn0.1Co0.1O2+2CO2. The results of Example 1 are summarized in Table 2.

TABLE 2

TGA Analysis Results of NMC 811 precursor and Li2CO3

| No | Temperature Range (° C.) | Weight Loss Amount (wt %) | Gaseous components attributed to the weight loss |
|---|---|---|---|
| 1 | 167 to 267 | 7.18 | $H_2O$ |
| 2 | 267 to 459 | 6.10 | $H_2O$, $CO_2$ |
| 3 | 459 to 812 | 9.47 | $H_2O$, $CO_2$ |
| 4 | 812 to 950 | 0 | N/A |

The results in Table 2 show that the removal of water from the precursor material occurred in stages at lower temperatures, before the material reached the maximum process temperature of 950 degrees Celsius.

An invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. An apparatus for controlling the atmosphere inside a calcination furnace for the production of lithium ion or solid state battery cathode material comprising:
   a first sensor group, installed in a first furnace temperature zone, the first sensor group comprising a first oxygen sensor, a first moisture sensor and a first carbon dioxide sensor;
   a second sensor group, installed in a second furnace temperature zone, the second sensor group comprising a second oxygen sensor, a second moisture sensor and a second carbon dioxide sensor;
   an oxygen delivery system operationally configured be placed in fluid flow communication with a source of oxygen to deliver independently regulated streams of oxygen to the first and second furnace temperature zones;
   a process controller operationally configured to communicate with the sensors and oxygen delivery system to control the delivery rate of oxygen to the first and second temperature zones in response to signals from the first and second sensor groups.

2. The apparatus of claim 1, further comprising a first sampling line operationally configured to withdraw a sample of the atmosphere from inside the first temperature zone of the furnace and deliver it to a first external sensor; the first external sensor operationally configured to communicate with the process controller.

3. The apparatus of claim 2, wherein the first oxygen sensor is an in-situ sensor.

4. The apparatus of claim 2, wherein the first external sensor is a sensor for measuring a parameter selected from the group consisting of: oxygen, pressure, dew point, carbon dioxide, ammonia, SOx, NOx and differential pressure.

5. The apparatus of claim 2, wherein the first sampling line comprises a moisture removal device operationally configured to remove moisture from the sample of furnace atmosphere.

6. The apparatus of claim 2, wherein the first furnace zone comprises an upper region and a lower region; the first oxygen sensor being positioned in the upper region and an inlet configured to deliver oxygen from the oxygen delivery system positioned in the lower region.

7. The apparatus of claim 2, wherein the first sampling line passes through a furnace wall; the sampling line comprising an interior length formed from a ceramic material and positioned inside the furnace wall, and an exterior length form from stainless steel and positioned outside the furnace wall.

8. The apparatus of claim 3 wherein the first sensor group and the first external sensor are operationally configured to communicate with a first sensor node; the first sensor node operationally configured to communicate with the process controller.

9. The apparatus of claim 2, wherein the first sensor group further comprises a first gas flow velocity sensor and the second sensor group further comprises a second gas flow sensor.

10. An apparatus for controlling the atmosphere inside a calcination furnace for the production of lithium ion or solid state battery cathode material comprising:
    a first sensor group, installed in a first furnace temperature zone, the first sensor group comprising a first oxygen sensor, a first moisture sensor, a first carbon dioxide sensor, and/or a first gas flow velocity sensor;
    a second sensor group, installed in a second furnace temperature zone, the second sensor group comprising a second oxygen sensor, a second moisture sensor, a second carbon dioxide sensor, and/or a second gas flow velocity sensor;

an oxygen delivery system operationally configured be placed in fluid flow communication with a source of oxygen to deliver independently regulated streams of oxygen to the first and second furnace temperature zones;

a process controller operationally configured to communicate with the sensors and oxygen delivery system to control a delivery rate of oxygen to the first and second temperature zones in response to signals from the first and second sensor groups; and a first sampling line operationally configured to withdraw a sample of the atmosphere from inside the first temperature zone of the furnace and deliver it to a first external sensor; the first external sensor operationally configured to communicate with the process controller.

11. The apparatus of claim 10 wherein the first sampling line comprises a moisture removal device operationally configured to remove moisture from the sample of furnace atmosphere.

12. The apparatus of claim 10 wherein the first external sensor is a sensor for measuring a parameter selected from the group consisting of: oxygen, pressure, dew point, carbon dioxide, ammonia, SOx, NOx and differential pressure.

13. The apparatus of claim 10, wherein the first furnace zone comprises an upper region and a lower region; the first oxygen sensor being positioned in the upper region and an inlet configured to deliver oxygen from the oxygen delivery system positioned in the lower region.

14. The apparatus of claim 10, wherein the first sampling line passes through a furnace wall; the sampling line comprising an interior length formed from a ceramic material and positioned inside the furnace wall, and an exterior length form from stainless steel and positioned outside the furnace wall.

15. The apparatus of claim 10 wherein the first sensor group and the first external sensor are operationally configured to communicate with a first sensor node; the first sensor node operationally configured to communicate with the process controller.

* * * * *